United States Patent
Brown (10) Patent No.: US 10,379,265 B2
(45) Date of Patent: Aug. 13, 2019

(54) SURFACE DISPLAY UNITS WITH OPAQUE SCREEN

(71) Applicant: CORNING INCORPORATED, Corning, NY (US)

(72) Inventor: Gordon Charles Brown, Rock Stream, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/572,346

(22) PCT Filed: May 10, 2016

(86) PCT No.: PCT/US2016/031602
§ 371 (c)(1),
(2) Date: Nov. 7, 2017

(87) PCT Pub. No.: WO2016/183059
PCT Pub. Date: Nov. 17, 2016

(65) Prior Publication Data
US 2018/0149777 A1 May 31, 2018

Related U.S. Application Data

(60) Provisional application No. 62/169,663, filed on Jun. 2, 2015, provisional application No. 62/159,477, filed on (Continued)

(51) Int. Cl.
*G02F 1/1334* (2006.01)
*G02B 5/00* (2006.01)
(Continued)

(52) U.S. Cl.
CPC .............. *G02B 5/003* (2013.01); *B60K 35/00* (2013.01); *G02B 1/02* (2013.01); *G02B 1/04* (2013.01);
(Continued)

(58) Field of Classification Search
CPC .................................................. G02B 5/003
See application file for complete search history.

(56) References Cited

U.S. PATENT DOCUMENTS 3,467,252 A 9/1969 Freiman
3,541,330 A 11/1970 Eichelberger et al.
(Continued)

FOREIGN PATENT DOCUMENTS

DE 19703592 A1 8/1998
DE 102005010523 A1 9/2006
WO 2001014927 A1 3/2001

OTHER PUBLICATIONS

"Pro Diffusion TM Film"; 2006, pp. 1-1; URL:http://prodisplay.com/wp-content/uploads/2014/08/pro-diffusion-rear-projection-film.Pdf.
(Continued)

*Primary Examiner* — James A Dudek (57) ABSTRACT

A surface display unit incorporates an opaque screen (180) and an image panel (110). The opaque screen is disposed on the front side of the image panel which provides an optical image. The opaque screen generally hides the image panel while the surface display unit is not in use. When the image panel is activated to provide an optical image, the opaque screen provides a suitable level of transparency so that a viewer can observe the optical image with sufficient clarity. The opaque screen can provide optical enhancement, decorative texture, and/or mechanical support and include antiglare, anti-reflective, and anti-scratch films (140, 150, 160). The opque screen can be a laminated polymer film, an electrochromic or photochromic system, or a switchable dye doped liquid crystal material.

20 Claims, 3 Drawing Sheets

Related U.S. Application Data on May 11, 2015, provisional application No. 62/159,682, filed on May 11, 2015.

(51) Int. Cl.

| | |
|---|---|
| *G02B 5/02* | (2006.01) |
| *B60K 35/00* | (2006.01) |
| *G02B 1/02* | (2006.01) |
| *G02B 1/04* | (2006.01) |
| *G02B 5/23* | (2006.01) |
| *G02B 27/14* | (2006.01) |
| *G02F 1/153* | (2006.01) |
| *G03B 21/60* | (2014.01) |

(52) U.S. Cl.
CPC ........... *G02B 5/021* (2013.01); *G02B 5/0236* (2013.01); *G02B 5/0257* (2013.01); *G02B 5/0278* (2013.01); *G02B 5/0294* (2013.01); *G02B 5/23* (2013.01); *G02B 27/14* (2013.01); *G02F 1/153* (2013.01); *G03B 21/60* (2013.01); *B60K 2350/106* (2013.01); *B60K 2350/2078* (2013.01)

(56) References Cited

U.S. PATENT DOCUMENTS

| | | | |
|---|---|---|---|
| 3,579,879 A | 5/1971 | Samuels | |
| 3,715,619 A | 2/1973 | Cotter | |
| 3,781,846 A | 12/1973 | Eichelberger et al. | |
| 4,300,817 A | 11/1981 | Betensky | |
| 4,582,394 A | 4/1986 | Boyd | |
| 5,552,922 A | 9/1996 | Magarill | |
| 5,604,624 A | 2/1997 | Magarill | |
| 5,623,368 A | 4/1997 | Calderini et al. | |
| 6,532,044 B1 | 3/2003 | Conner et al. | |
| 6,577,355 B1 | 6/2003 | Yaniv | |
| 6,970,289 B1 | 11/2005 | Auerbach et al. | |
| 6,988,339 B2 | 1/2006 | Pylkki et al. | |
| 7,661,828 B2 | 2/2010 | Allen et al. | |
| 7,756,170 B2 | 7/2010 | Almoric et al. | |
| 7,815,056 B2 | 10/2010 | Coppola et al. | |
| 8,045,260 B2 | 10/2011 | Bhatia et al. | |
| 8,114,502 B2 | 2/2012 | Emslander et al. | |
| 8,376,551 B2 | 2/2013 | Cobb | |
| 8,444,272 B2 | 5/2013 | Cobb | |
| 8,690,342 B2 | 4/2014 | Gollier | |
| 8,757,807 B1 | 6/2014 | Disley | |
| 8,912,925 B2 | 12/2014 | Wang | |
| 8,986,072 B2 | 3/2015 | Darcangelo et al. | |
| 9,013,515 B2 | 4/2015 | Joseph et al. | |
| 9,013,524 B2 | 8/2015 | Geng et al. | |
| 9,557,846 B2 | 1/2017 | Baharav et al. | |
| 2006/0046159 A1 | 3/2006 | Emslander et al. | |
| 2006/0134564 A1* | 6/2006 | Chari | G02F 1/1334 430/330 |
| 2009/0153749 A1 | 6/2009 | Mixon | |
| 2009/0167966 A1 | 7/2009 | Nam et al. | |
| 2010/0014319 A1* | 1/2010 | Oversluizen | G02B 6/0051 362/627 |
| 2012/0094084 A1 | 4/2012 | Fisher et al. | |
| 2012/0328843 A1 | 12/2012 | Cleary et al. | |
| 2013/0045359 A1 | 2/2013 | Wang et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0128351 A1 | 5/2013 | Gollier | |
| 2013/0258485 A1 | 10/2013 | Boek et al. | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0078410 A1 | 3/2014 | Wang | |
| 2014/0087159 A1 | 3/2014 | Cleary et al. | |
| 2014/0087193 A1 | 3/2014 | Cites et al. | |
| 2014/0125900 A1 | 5/2014 | Li | |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0309309 A1 | 10/2015 | Laluque et al. | |
| 2015/0321940 A1 | 11/2015 | Dannoux et al. | |
| 2016/0048016 A1 | 2/2016 | Crane et al. | |
| 2016/0082705 A1 | 3/2016 | Fisher et al. | |
| 2016/0145139 A1 | 5/2016 | Fredholm et al. | |
| 2016/0207290 A1 | 7/2016 | Cleary et al. | |
| 2016/0207819 A1 | 7/2016 | Cleary et al. | |
| 2016/0207820 A1 | 7/2016 | Cleary et al. | |
| 2016/0250825 A1 | 9/2016 | Cleary et al. | |
| 2017/0082915 A1 | 3/2017 | Tao et al. | |

OTHER PUBLICATIONS

International Search Report and Written Opinion of the International Searching Authority; PCT/US2016/031602; dated Sep. 30, 2016; 18 Pages; European Patent Office.

Invitation to Pay Additional Fees of the International Searching Authority; PCT/US2016/031602; dated Aug. 8, 2016; 9 Pages; European Patent Office.

* cited by examiner

SURFACE DISPLAY UNITS WITH OPAQUE SCREEN

CROSS-REFERENCE TO RELATED APPLICATIONS

This application is a national stage entry of International Patent Application Serial No. PCT/US16/31602 filed on May 10, 2016, which the benefit of priority under 35 U.S.C. § 119 of U.S. Provisional Application Ser. No. 62/169,663 filed on Jun. 2, 2015, U.S. Provisional Application Ser. No. 62/159,682 filed on May 11, 2015 and U.S. Provisional Application Ser. No. 62/159,477 filed on May 11, 2015, the content of which are relied upon and incorporated herein by reference in their entirety.

FIELD

The present disclosure relates generally to the field of surface display units and specifically to surface display units employing an opaque screen.

BACKGROUND

Surface display units are devices that display images, signs, symbols, and/or messages as needed. Surface display units may be configured to display a predefined shape, word, symbol, message, and/or image, for example. Examples of such surface display units include warning lights on a stove when the surface temperature of a heating unit is hot, warning lights for indicating low fuel status or unbuckled seat belt on an automobile, traffic or crosswalk lights on roads, and so on. Alternately, a surface display unit may be configured to display a selected display content out of many possibilities. Typically, such surface display units are multipixel display devices, i.e., display devices employing multiple pixels. The mechanism for providing illumination in multipixel display devices may include light emitting diodes (including organic light emitting diodes) and liquid crystal displays. Products employing multipixel display devices include computer monitors, television sets, screens of portable digital devices, and so on.

Surface display units typically need to be mechanically protected in order to prevent accidental damage. The need to provide protection to surface display units may be greater for surface display units that are subjected to mechanical impact and/or temperature extremes. For example, inside surfaces of automobile (such as the dashboard, door panels, and backside surfaces of seats), televisions, monitors, household appliances or architectural structures may be subjected to accidental pushing, pressing, or rubbing by users, and may be subjected to temperature extremes, e.g. in the summer or in the winter in certain climates.

Further, sunlight can shine on surface display units (especially in an automobile and buildings) from time to time, reducing the clarity of the signal or message, or level of enjoyment of the viewer from time to time. In addition, surface texture providing a luxurious atmosphere may be desirable for surface display units incorporated into vehicles such as automobiles, boats, and airplanes (e.g., glazing such as windshields, windows or sidelites, mirrors, pillars, side panels of a door, headrests, dashboards, consoles, or seats of the vehicle, or any portions thereof), architectural fixtures or structures (e.g., windows, internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, tablets, and music players), furniture, information kiosks, retail kiosks, and the like.

SUMMARY

According to various aspects of the disclosure, surface display units incorporating opaque screens are provided. As used herein, the term "opaque" refers to the opacity perceived by a user or viewer of the surface display unit when the surface display unit is in a powered "off" state or opaque but powered "on" state. Opaque may include a transmittance of 0% to about 25% within the wavelength range from 400 nm to 800 nm. In at least various embodiments, the opaque screens may provide one or more property chosen from optical enhancement, decorative texture, and/or mechanical support or protection to the surface display unit. The opaque screen can be proximate to or disposed on the front side (i.e., the side facing the viewer) of an image source or panel that provides an optical image (and thus, the optical image is visible through the opaque screen). In such embodiments, the opaque screen generally hides the image panel while the surface display unit is not in use. When the image panel is activated to provide an optical image, the opaque screen may provide some degree of transparency such that a viewer can observe the optical image with sufficient clarity.

In one or more embodiments, the opaque screen may function as a screen for an image source, such as a projector, that provides an optical image on the opaque screen from the front side (i.e., the side of the viewer). In some embodiments, the optical image is visible either through the opaque screen (in the case where the opaque screen is between the viewer and the image source) or on the opaque screen (in the case where the viewer and the image source are on the same side as one another).

According to an aspect of the present disclosure, a surface display unit is provided, which comprises an image panel configured to provide an optical image on a front surface thereof; and an opaque screen disposed over the front surface of the image panel. The opaque screen comprises an opaque matrix material layer that attenuates light impinging thereupon from a front side of the opaque matrix material layer and transmitting light from the image panel. According to an aspect of the present disclosure, a surface display unit is provided, which comprises an opaque screen including a front surface, and an image source disposed on the same side as a viewer (with respect to the opaque screen), the image source configured to provide an optical image on the front surface. The opaque screen comprises an opaque matrix material layer that attenuates light impinging thereupon from a front side of the opaque matrix material layer and reflecting light from the image source.

In one or more embodiments, the surface display units incorporated into vehicles such as automobiles, boats, and airplanes (e.g., in glazing such as windshields, windows or sidelites, mirrors, pillars, side panels of a door, headrests, dashboards, consoles, or seats of the vehicle, or any portions thereof), architectural fixtures or structures (e.g., internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, tablets, and music players), furniture, information kiosks, retail kiosks, and the like. In one or more embodiments, an automobile comprises a surface and the surface display unit is disposed on at least a portion of the surface. The surface may include any one of a glazing (e.g., such as windshields, windows or sidelites), a mirror, a pillar, a door panel, an armrest, a headrest, a dashboard, a console, or a seat of the vehicle).

DETAILED DESCRIPTION

As discussed above, the present disclosure is directed to surface display units comprising an opaque screen, the various aspects of which are described herein in detail.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure without limitation. As used herein, a first element located "on" a second element can be located on an exterior side of a surface of the second element or on an interior side of the second element. As used herein, a first element is located "directly on" a second element if there exists a physical contact between a surface of the first element and a surface of the second element.

As used herein, a "layer" refers to a material portion including a region having a substantially uniform thickness. A layer may extend over the entirety of an underlying or overlying structure, or may have an extent less than the extent of an underlying or overlying structure. Further, a layer may be a region of a homogeneous or inhomogeneous contiguous structure that has a thickness less than the thickness of the contiguous structure. For example, a layer may be located between any pair of horizontal planes between, or at, a top surface and a bottom surface of the contiguous structure. A layer may extend horizontally, vertically, and/or along a tapered surface. A substrate may be a layer, may include one or more layers therein, or may have one or more layer thereupon, thereabove, and/or therebelow.

Figure 1:
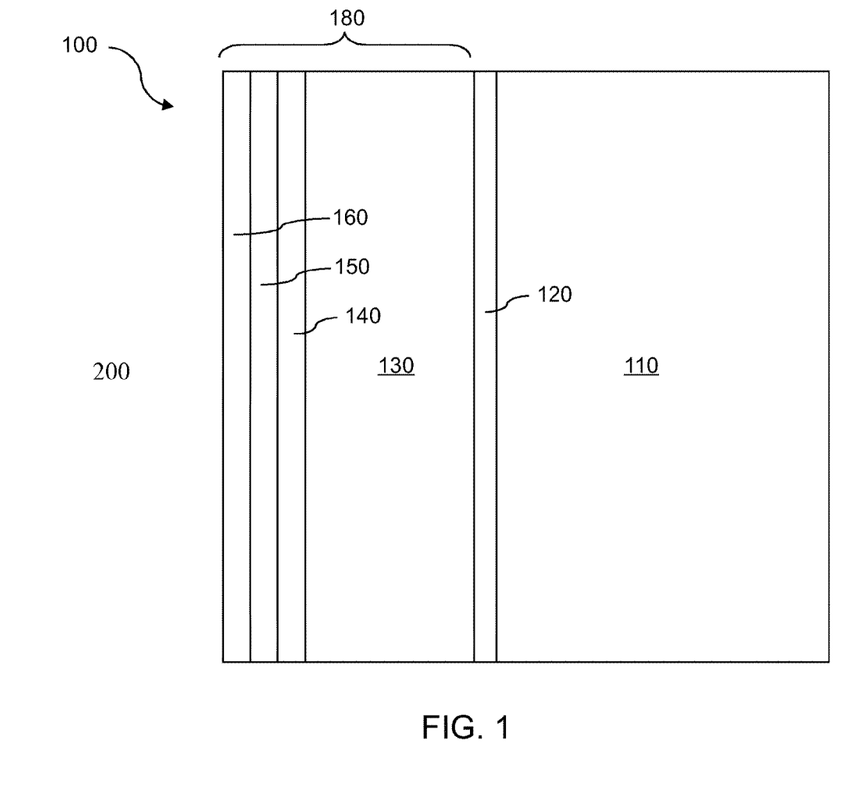
FIG. 1 is a schematic vertical cross-sectional view of an exemplary surface display unit incorporating an opaque screen that provides some degree of optical opacity and an image panel that provides an optical image according to an embodiment of the present disclosure.

Referring to FIG. 1, an exemplary surface display unit 100 is illustrated, which incorporates an opaque screen 180 that provides some degree of optical opacity, and an image panel 110 that provides an optical image. The image panel 110 may comprise a micro-LED, an OLED, a LCD, a plasma cell, an electroluminescent (EL) cell array, or another suitable element configured to emit radiation).

As used herein, an "optical image" can be any image that is generated by light (for example generated by a pattern of light). The light can be monochromatic, polychromatic, or can be a continuous spectrum of wavelengths. As used herein, an "image" can be any physical pattern, and includes pictures, letters, numbers, or any other pattern including contrast in color and/or brightness. The opaque screen 180 may, in at least some embodiments, provides protection for the image panel 110 from physical damage by being disposed in front of the image panel. The exemplary surface display unit 100 can include a stack of layers, which can be, from back to front in one exemplary and non-limiting embodiment, the image panel 110, a thin adhesive layer 120, an opaque matrix material layer 130, an optional anti-scratch layer 140, an optional antireflection layer 150, and an optional antiglare layer 160. Greater or fewer numbers of layers, and alternate configurations of layers, may be chosen in various embodiments.

Figure 2:
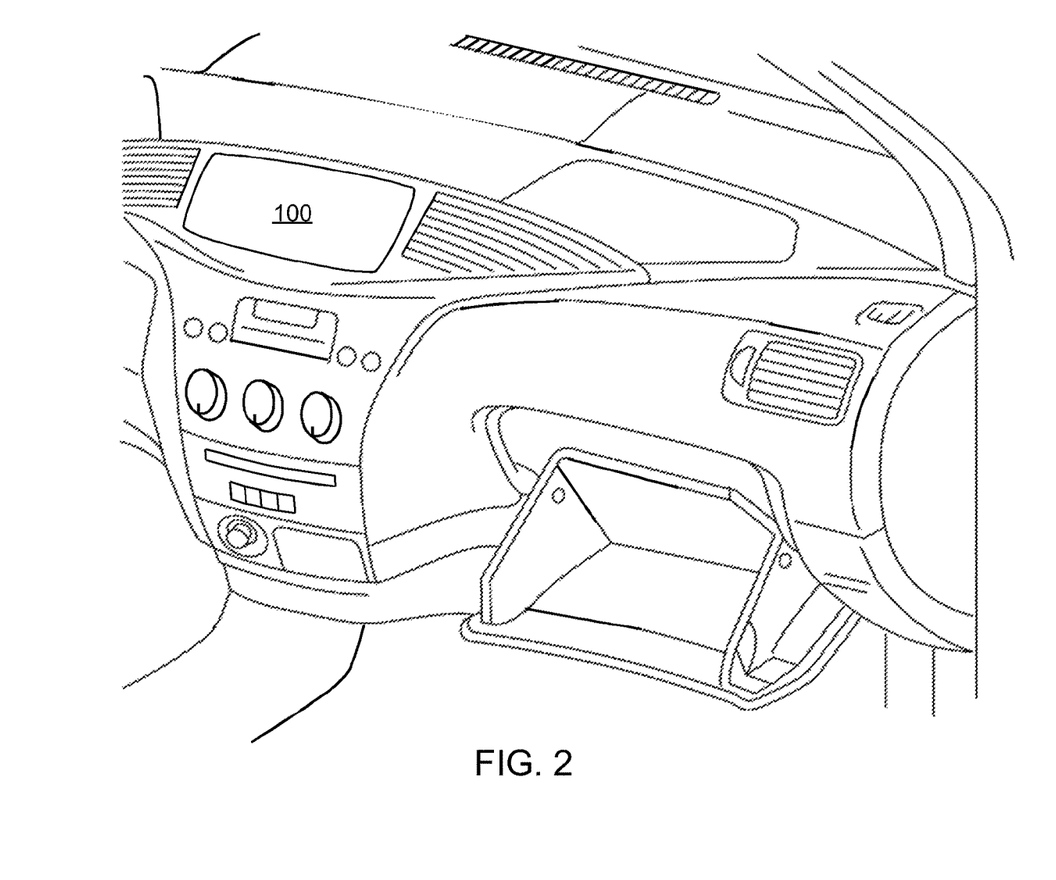
FIG. 2 is a schematic perspective view of the inside of an automobile having a dashboard with an exemplary surface display unit incorporated therein according to an embodiment of the present disclosure.

The exemplary surface display unit 100 of FIG. 1 may be useful in a variety of applications. For example, the exemplary surface display unit can be affixed in, on, or to any surface, which can be a fixed structure such as a wall of a building, or a surface of a household appliance (such as an oven or stove). Alternatively, the exemplary surface display unit 100 of FIG. 1 can be affixed in, on, or to a surface that is a component of a moving object, such as an automobile dashboard or console, an inner sidewall of a door, or a backside surface of a seat within an automobile, or a door of a refrigerator. In some instances, the surface display unit 100 may be utilized in vehicles such as automobiles, boats, and airplanes (e.g., glazing such as windshields, windows or sidelites, mirrors, pillars, side panels of a door, headrests, dashboards, consoles, or seats of the vehicle, or any portions thereof), architectural fixtures or structures (e.g., internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, tablets, and music players), furniture, information kiosks, retail kiosks, and the like. FIG. 2 illustrates an exemplary installation of the surface display unit 100 within a dashboard of an automobile. In one or more embodiments, an automobile comprises a surface and the surface display unit is disposed on at least a portion of the surface. The surface may include any one of a glazing (e.g., such as windshields, windows or sidelites), a mirror, a pillar, a door panel, an armrest, a headrest, a dashboard, a console, or a seat of the vehicle).

Referring back to FIG. 1, the opaque screen 180 may appear generally dark, or may appear to have a preselected color when the image panel 110 is not activated, i.e. does not generate an optical image. However, the opacity of the opaque screen 180, the composition and/or thickness of the adhesive layer 120, if present, and/or the brightness of the optical image may be selected such that the optical image generated on the image panel 110 can be transmitted through the opaque screen 180 without significant degradation of clarity of the optical image so that it may be visible to a user. In other words, the opaque screen 180 is a "see-through" screen, i.e. has some degree of transparency or translucency, for the purpose of viewing the optical image generated on the image panel 110.

The opaque screen 180 can include an opaque matrix material layer 130, which includes an optically opaque material having non-zero transmission coefficient to allow transmission of the optical image formed on the image panel 110. The opaque matrix material layer 130 can comprise one or more various types of materials to provide the desired functionalities. In one embodiment, the opaque matrix material layer 130, which may comprise one or more layers, can be thick enough to provide sufficient mechanical strength to the opaque screen 180, and/or to prevent breakage or fracture of the opaque screen 180. The thickness of the opaque screen 180 can be selected to minimize the volume of material layers present proximate to, or disposed on, the image panel 110. In one embodiment, the total thickness of material layers of the opaque screen 180 proximate to, or disposed on, the image panel 110 can range from about 0.3 mm to about 30 mm, from about 0.5 mm to about 20 mm, from about 0.7 mm to about 10 mm, or from about 1 mm to about 30 mm. In some embodiments, the total thickness of material layers of the opaque screen 180 can be in any range from about 1 mm to about 3 mm, from about 2 mm to about 6 mm, from about 3 mm to about 9 mm, from about 5 mm to about 15 mm, from about 10 mm to about 30 mm, or from any first intermediate thickness to any second intermediate thickness greater than the first intermediate thickness.

In one or more embodiments, the opaque screen 180 can provide a scattering surface on which a projected display may be visible. For example, as shown in FIG. 1, an image source 200 may be disposed on the same side as a viewer and the image may be projected from image source 200 onto the front surface of the opaque screen 180. In some embodiments, an image or images from the image panel 110 and from the image source 200 may be simultaneously visible on the front surface of the opaque screen 180. In some embodiments, an image or images from the image panel 110 or from the image source 200 may be visible on the front surface of the opaque screen 180 in a non-simultaneous fashion.

In various exemplary and non-limiting embodiments, the opaque matrix material layer 130 may comprise one or more layers comprising a polymeric material, glass material (e.g., soda lime glass, alkali aluminosilicate glass, alkali containing borosilicate glass and/or alkali aluminoborosilicate glass), poly-ceramic material, or glass-ceramic material, for example. The material may, in various embodiments, be provided as a single sheet or as part of a laminate or stacked structure. In cases where a laminate structure is employed for the opaque matrix material layer 130, the layers of the laminate may be chosen from the same or different materials.

In some examples, the thickness of one or more layers of the opaque matrix material layer 130 may be significantly reduced when provided as part of a laminate (e.g., less than about 1 mm), without the need for additional polishing or grinding steps often utilized to reduced thickness. According to various exemplary embodiments, the thickness of the individual layers and/or the total thickness of material layers of the opaque matrix material layer 130 can range from about 0.05 mm to about 30 mm, and can be in any range from about 0.1 mm to about 3 mm, from about 0.2 mm to about 6 mm, from about 3 mm to about 9 mm, from about 5 mm to about 15 mm, from about 10 mm to about 30 mm, or from any first intermediate thickness to any second intermediate thickness greater than the first intermediate thickness.

The glass materials used in embodiments of the opaque matrix materials may be provided using a variety of different processes. For instance, where the glass material may be formed using known forming methods include float glass processes and down-draw processes such as fusion draw and slot draw.

A glass material prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass material that can be lifted from the tin onto rollers. Once off the bath, the glass material can be cooled further and annealed to reduce internal stress.

Down-draw processes produce glass materials having a uniform thickness that possess relatively pristine surfaces. Because the average flexural strength of glass materials is controlled by the amount and size of surface flaws, a pristine surface that has had minimal contact has a higher initial strength. When this high strength glass material is then further strengthened (e.g., chemically), the resultant strength can be higher than that of a glass material with a surface that has been lapped and polished. Down-drawn glass materials may be drawn to a thickness of less than about 2 mm. In addition, down drawn glass materials have a very flat, smooth surface that can be used in its final application without costly grinding and polishing.

The glass material may be formed using a fusion draw process, for example, which uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass material. The fusion draw method offers the advantage that, because the two glass films flowing over the channel fuse together, neither of the outside surfaces of the resulting glass material comes in contact with any part of the apparatus. Thus, the surface properties of the fusion drawn glass material are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous material and into an annealing region.

In some embodiments, the compositions used for the glass material may be batched with 0 mol % to about 2 mol. % of at least one fining agent selected from a group that includes $Na_2SO_4$, NaCl, NaF, NaBr, $K_2SO_4$, KCl, KF, KBr, and $SnO_2$.

Once formed, a glass material may be strengthened to form a strengthened glass material. It should be noted that glass-ceramics described herein may also be strengthened in the same manner as glass materials. As used herein, the term "strengthened material" may refer to a glass material or a glass-ceramic material that has been chemically strengthened, for example through ion-exchange of larger ions for smaller ions in the surface of the glass or glass-ceramic material. However, other strengthening methods known in the art, such as thermal tempering, may be utilized to form strengthened glass materials and/or glass-ceramic materials. In some embodiments, the materials may be strengthened using a combination of chemical strengthening processes and thermally strengthening processes.

The strengthened materials described herein may be chemically strengthened by an ion exchange process. In the ion-exchange process, typically by immersion of a glass or glass-ceramic material into a molten salt bath for a predetermined period of time, ions at or near the surface(s) of the glass or glass-ceramic material are exchanged for larger metal ions from the salt bath. In one embodiment, the temperature of the molten salt bath is in the range from about 400° C. to about 430° C. and the predetermined time period is about four to about twenty-four hours; however the temperature and duration of immersion may vary according to the composition of the material and the desired strength attributes. The incorporation of the larger ions into the glass or glass-ceramic material strengthens the material by creating a compressive stress in a near surface region or in regions at and adjacent to the surface(s) of the material. A corresponding tensile stress is induced within a central region or regions at a distance from the surface(s) of the material to balance the compressive stress. Glass or glass-ceramic materials utilizing this strengthening process may be described more specifically as chemically-strengthened or ion-exchanged glass or glass-ceramic materials.

In one example, sodium ions in a strengthened glass or glass-ceramic material are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass-ceramic can be replaced by Ag+ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened material that results in a stress profile. The larger volume of the incoming ion produces a compressive stress (CS) on the surface and tension (central tension, or CT) in the center of the strengthened material. The compressive stress is related to the central tension by the following relationship:

$$CS = CT\left(\frac{t - 2DOL}{DOL}\right)$$

where t is the total thickness of the strengthened glass or glass-ceramic material and compressive depth of layer (DOL) is the depth of exchange. Depth of exchange may be described as the depth within the strengthened glass or glass-ceramic material (i.e., the distance from a surface of the glass material to a central region of the glass or glass-ceramic material), at which ion exchange facilitated by the ion exchange process takes place.

In one embodiment, a strengthened glass or glass-ceramic material can have a surface compressive stress of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass or glass-ceramic material may have a compressive depth of layer 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass or glass-ceramic material has one or more of the following: a surface compressive stress greater than 500 MPa, a depth of compressive layer greater than 15 μm, and a central tension greater than 18 MPa.

Example glasses that may be used in the glass material may include alkali aluminosilicate glass compositions or alkali aluminoborosilicate glass compositions, though other glass compositions are contemplated. Such glass compositions may be characterized as ion exchangeable. As used herein, "ion exchangeable" means that a material comprising the composition is capable of exchanging cations located at or near the surface of the material with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the material includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the material can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the material comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the glass material comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the glass material comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma modifiers) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers) > 1$.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3$ 2 mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the glass material may comprise an alkali aluminosilicate glass composition comprising: 2 mol % or more of $Al_2O_3$ and/or $ZrO_2$, or 4 mol % or more of $Al_2O_3$ and/or $ZrO_2$.

In some instances, the opaque matrix material may incorporate a glass-ceramic that may be fusion-formed or formed by other known methods such as rolling, thin-rolling, slot draw or float. In some embodiments, a glass-ceramic layer provided as part of a laminate may be fusion formed.

Exemplary glass-ceramics useful according to various embodiments described herein may be characterized by the processes by which they can be formed. Such glass-ceramics may be formed by float processes, fusion processes, slot draw process, thin rolling processes, or a combination thereof. Some glass-ceramics tend to have liquidus viscosities that preclude the use of high throughput forming methods such as float, slot draw, or fusion draw. For example, known glass-ceramics are formed from precursor glasses having liquidus viscosities of about 10 kP, which are not suitable for fusion draw, where liquidus viscosities of above 100 kP or above 200 kP are generally required. Glass-ceramics formed by the low throughput forming methods (e.g., thin rolling) may exhibit enhanced opacity, various degrees of translucency, and/or surface luster. Glass-ceramics formed by high throughout methods (e.g., float, slot draw, or fusion draw) can achieve very thin layers. Glass-ceramics formed by fusion draw methods may achieve pristine surfaces and thinness (e.g., about 2 mm or less). Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, glass-ceramics including crystalline phases of any one or more of mullite, spinel, α-quartz, β-quartz solid solution, petalite, lithium dissilicate, β-spodumene, nepheline, and alumina, and combinations thereof.

In one embodiment, the opaque matrix material layer 130 can include a combination of a glass layer and a diffusion material layer (e.g., a diffuser film or a light-scattering film). According to various exemplary embodiments, the diffusion layer may comprise a polymeric material. The diffuser material layer may be a single layer or a stack of multiple layers provided that there is at least one material layer that is engineered to provide optical scattering. In an illustrative example, optical scattering within a diffusion material layer may be provided by a light diffuser film made of polymers.

The glass layer may be replaced with any other optically transparent material layer in various exemplary embodiments such as embodiments where durability is not an issue or in non-window applications (as in the case of a surface display unit located on an exterior door panel of an automobile, door of an appliance, walls, countertops, monitors and the like).

In one embodiment, high ambient contrast may be provided by minimizing the effect of ambient radiation impinging on the opaque matrix material layer 130, while minimizing the change in the transmission coefficient of the light from the image panel 110.

In one embodiment, the opaque matrix material layer 130 can include a glass core with at least one optically opaque cladding thereupon. The at least one optically opaque cladding can include a ceramic material or glass-ceramic material having optical opacity. The transmission coefficient of each optically opaque cladding can be in a range from 0.01 to 0.5. In one embodiment, the transmission coefficient of each optically opaque cladding can be in a range from 0.01 to 0.05, from 0.02 to 0.1, from 0.03 to 0.14, from 0.05 to 0.15, from 0.1 to 0.5, or any intermediate range between any of the previous ranges. In one embodiment, a pair of optically opaque claddings can be provided such that both sides of the glass core are contacted by an optically opaque cladding. Optionally, one or both of the optically opaque claddings can be machined with laser ablation, or with a liquid phase etchant or a gas phase etchant to provide a decorative ceramic laminated glass.

In one embodiment, the opaque matrix material layer 130 can include a dye-sensitized material layer. In this case, the opaque matrix material layer 130 can be a dye-sensitized screen (i.e., a dye-doped screen) that changes color upon irradiation of an activating radiation thereupon. In one embodiment, the activating radiation may be provided by a light source (not shown) provided on either side, or on both sides, of the opaque matrix material layer 130. In another embodiment, the activating radiation may be provided by a light source provided within the image panel 110. In this case, the activating radiation may be provided by a set of at least one dedicated light source embedded within the image panel 110 and separate from the light sources employed to form the optical image, or may be provided by a subset of the light sources that can be employed to form the optical image. In one embodiment, the activating radiation may be ultraviolet light or visible light. The activating radiation may be provided by one or more light emitting diodes. In one embodiment, only one type of activating radiation source may be provided. In another embodiment, multiple dye materials that are activated to emit lights of different wavelengths and/or activated by radiation of different wavelengths may be embedded within the opaque matrix material layer 130. In this case, multiple types of activating radiation having different wavelengths may be employed to cause the opaque matrix material layer 130 to display different colors depending on the wavelength of the activating radiation.

In one embodiment, the opaque matrix material layer 130 can include a dye-doped liquid crystal that incorporates two or more materials that interact with each other or with one another to generate optical effects. In one embodiment, the dye-doped liquid crystal can be employed to reduce transmission of light, thereby providing an opaque material portion that provides a low level of optical transmission from the image panel 110 to the viewer.

In one embodiment, the opaque matrix material layer 130 can include a material having one or more peaks in the transmission coefficient as a function of wavelength within the range from 400 nm to 800 nm. In one embodiment, the peaks in the transmission coefficient can correspond to the wavelengths of illumination radiation of the optical image formed at the image panel 110. For example, if the optical image is formed by active matrix light emitting diodes embedded within the image panel 110, the wavelengths of the peaks in the transmission coefficient of the material of the opaque matrix material layer 130 can roughly correspond to the peak wavelengths of the light emitting diodes in the image panel 110. For example, if the image panel 110 employs red, green, and blue light emitting diodes, the peaks in the transmission coefficient of the material of the opaque matrix material layer 130 can coincide with the wavelengths at which the intensity of each radiation from the red, green, and blue light emitting diodes becomes a maximum. The generally light-absorbing property of the opaque matrix material layer 130 can decrease scattering of ambient light, thereby enhancing the contrast of the optical image displayed on the image panel 110.

In one embodiment, the opaque matrix material layer 130 can include any combination of previously described material layers to provide multiple functionalities. In this case, the transmissive coefficient of the opaque matrix material layer 130 can be the product of the transmissive coefficients of the individual material layers employed for the opaque matrix material layer 130.

The opaque screen 180 can include at least one additional layer to provide desired optical properties to a viewer. For example, the protective optical screen may optionally include at least one optical material layer chosen to reduce or prevent hazing (caused by lateral scattering of light), halo effects, and/or ghosting (manifestation of multiple images due to multiple reflections). It may, in various embodiments, be desirable to choose a combination of materials to achieve such effects.

In one embodiment, the opaque screen 180 may include optical features configured to channel or guide light from the front surface of the image panel 110.

In other embodiments, the opaque screen 180 may be substantially free of optical defects, such as distortions (e.g., those created by draw lines from glass forming) and flaws that could diminish the quality of the display. Such defects are often found in typical thick glass, such as thick soda lime glass, which is formed by float methods. In other words, the opaque screen 180 may exhibit high end display quality attributes typically found in high definition televisions and other electronic devices. In other embodiments, the opaque screen 180 provides a touch-ready surface that enables touch functionality.

In other embodiments, the opaque screen 180 may be suitable for surface treatments including coatings, to enhance the display performance. The opaque screen 180 can optionally include an antiglare layer 160, an antireflection layer 150, an anti-scratch layer 140, or any combination thereof. In case more than one of the antiglare layer 160, the antireflection layer 150, and the anti-scratch layer 140 is provide, the order of the various layers may be permutated as needed. For example, an antiglare layer can be provided in surface display units in order to provide a low level of gloss on the front side of the surface display units. In one embodiment, the outermost layer may be an antiglare layer 160.

The antiglare layer 160, if present, provides anti-glare finish. The antiglare layer 160 may be a contiguous layer or may include particles adhering to an underlying layer. The anti-glare finish is an optional finish that can be applied to the surface of the surface display unit 100 that faces the viewer. The anti-glare finish can be provided, for example, by texturing the surface to provide macro features, and/or disposing macro-sized features (e.g., particles) on the surface of the glass. The anti-glare finish provides a smooth finish for touch function/"swiping" due to reduced surface area on which the user's finger glides. Such smooth finish can alternatively be provided by applying various coatings including "easy to clean" (or hydrophobic/oleophobic) coatings that are currently found on many mobile phones.

In one embodiment, the opaque screen 180 may include a polarization filter to reduce scattering of ambient light without hindering transmission of the light therethrough from the image panel 110.

In one embodiment, an adhesive layer 120 may be employed between the opaque screen 180 and the image panel 110. The adhesive layer 120 may have a thickness in a range from 0.5 micron to 100 microns, although lesser and greater thicknesses can also be employed. The material of the thin adhesive layer 120 may be selected to minimize scattering of light at the thin adhesive layer.

Optionally, a backer material layer (a light blocking material layer) may be employed to shield the LED's, which is disposed behind the backer. In some cases, the backer material layer can be a stencil that shows some functional indicators. If present, the backer material layer may be disposed between the opaque matrix material layer 130 and the image panel 110.

In one embodiment, the opaque matrix material layer 130 may be capable of being switched between two states. The opaque matrix material layer 130 may provide a first level of light transmission in a first state, or an "on" state, and provide a second level of light transmission in a second state, or an "off" state. The transmission coefficient of the opaque matrix material layer 130 as a function of wavelength is thus dependent on the state of the opaque matrix material layer 130.

Figure 3:
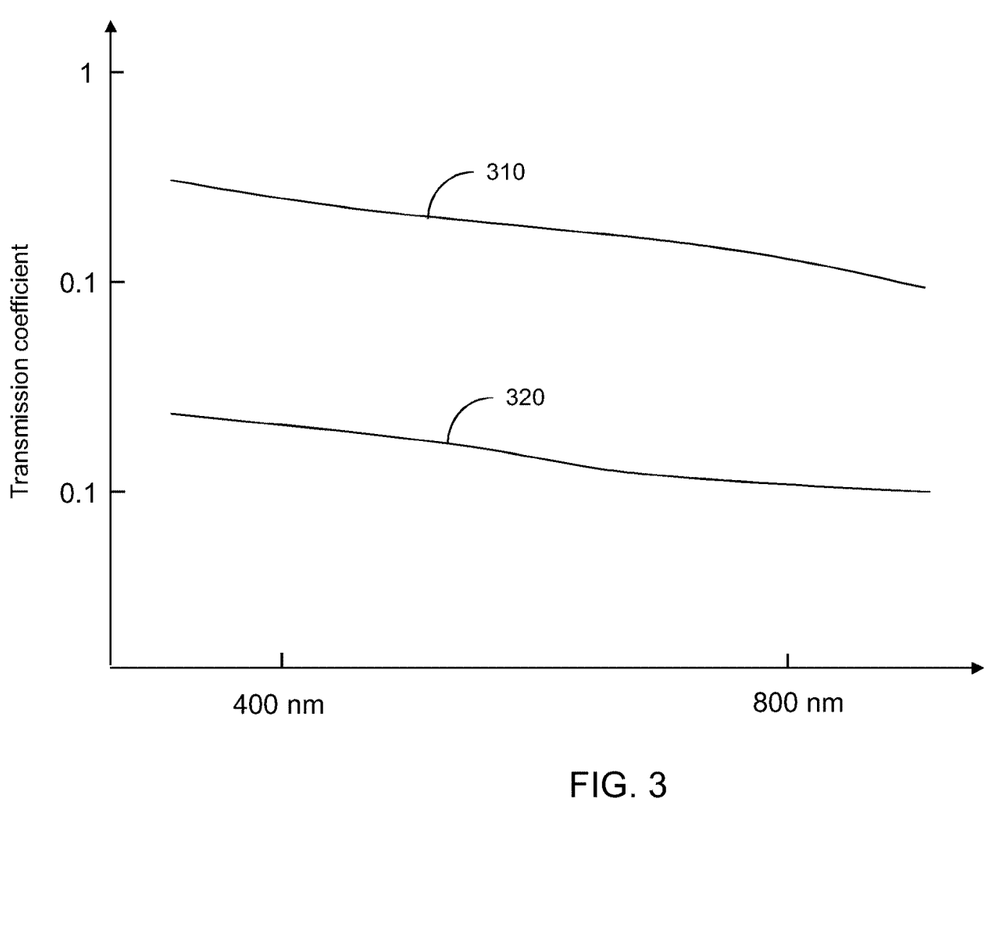
FIG. 3 is a graph illustrating changes in transmission coefficient for embodiments in which the optical properties of the opaque matrix material layer changes upon application of a suitable external stimulus.

FIG. 3 illustrates an exemplary set of transmission coefficient curves that can be provided by a bi-state or multi-state opaque matrix material layer 130. The opaque matrix material layer 130 can have a first transmission coefficient curve 310, or an "on-state transmission coefficient curve," as a function of wavelength when the opaque matrix material layer 130 is in the on state, and can have a second transmission coefficient curve 320, or an "off-state transmission coefficient curve," as a function of wavelength when the opaque matrix material layer 130 is in the off state. The ratio of the transmission coefficient for the off-state to the transmission coefficient for the on-state may be in a range from 0.001 to 0.5 within the wavelength range from 400 nm to 800 nm. The ratio of the transmission coefficient for the off-state to the transmission coefficient for the on-state may be, within the wavelength range from 400 nm to 800 nm, in any one of the ranges from 0.001 to 0.05, from 0.002 to 0.01, from 0.005 to 0.025, from 0.01 to 0.05, from 0.02 to 0.1, from 0.05 to 0.025, and from 0.1 to 0.5, or any of the ranges in between. In some examples, the display surface unit is at least partially transparent to visible light. Ambient light (e.g., sunlight) may make the display image difficult or impossible to see when projected or emitted on such a display surface. In some examples, the display surface, or portion thereof on which the display image is projected or emitted, can include a darkening material such as, for example, an inorganic or organic photochromic or electrochromic material, a suspended particle device and/or a polymer dispersed liquid crystal. Thus, the transparency of the surface can be adjusted to increase the contrast of the display image provided at the display surface. For example, the transparency of the display surface can be reduced in bright sunlight by darkening the display surface to increase the contrast of the display image. The adjustment can be controlled automatically (e.g., in response to exposure of the display surface to a particular wavelength of light, such as ultraviolet light, or in response to a signal generated by a light detector, such as a photoeye) or manually (e.g., by a viewer).

In one or more embodiments, the different transmission coefficients in different states of the opaque matrix material layer 130 can be provided by any known method, for example by choosing an electrochromatic material or a photochromatic material. In one embodiment, the opaque matrix material layer 130 can include electrochromatic material layer. In this case, the opaque matrix material layer 130 can include an electrochromatic material that becomes more opaque upon application of a voltage bias.

In one embodiment, the opaque matrix material layer 130 can include a photochromatic material layer. The photochromatic material changes transmission coefficient when activated by an activating radiation. For example, the photochromatic material can include a matrix of polyvinyl butyral (PVB) embedding quantum dots that are activated by the activating radiation, and render the matrix semi-opaque or opaque.

Referring back to FIG. 1, the image panel 110 can include an image display device, i.e., a device that displays an optical image. In one embodiment, the image panel 110 can include a display unit that generates an image employing a single illumination source such as a dead front display device. Alternatively or additionally, the image panel 110 can include a pixilated display device such as a liquid crystal display device and/or a light emitting display device.

In one embodiment, the image panel 110 may include micro light emitting diodes (micro-LED's). A plurality of micro-LED's can be provided in an array pattern so that each micro-LED constitutes a sub-pixel of a pixilated display device. A layer of a semiconductor material (such as silicon) controls the amount of light each micro-LED emits. Thus, each micro-LED itself serves as the component that forms an image. In one embodiment, the micro-LED's can be provided as a pixilated display device including a set of multiple micro-LED's having different colors within each pixel.

In one embodiment, the image panel 110 can have multiple brightness settings to provide different amount of illumination during the day time and the night time. In one embodiment, the brightness of the image panel 110 may be automatically adjusted to provide a suitable level of illumination from the display image to the viewer. In one embodiment, an ambient light sensor located in proximity to the opaque screen 180 can provide the necessary input to determine the optimal brightness level of the image displayed on the image panel 110.

In one embodiment, the image panel 110 can have a color weighted brightness adjustment system to compensate for a non-uniform transmission coefficient curve within the visible wavelength range. For example, if the opaque matrix material layer 130 provides a higher transmission coefficient for red light than for blue light, the color weighted brightness adjustment system of the image panel 110 can increase the brightness of the illumination for the blue light and/or decrease the brightness of the illumination for the red light so that the viewer perceives an optical image having the same color intensity distribution as would be present within an original optical image, i.e., an optical image without any optical filter thereupon.

In one embodiment, the viewing angle of the surface display unit can be selected to suit the purpose of the displayed images. If the surface display unit primarily displays images intended for entertainment, the viewing angle for the surface display unit can be adjusted to provide viewing capability to all potential viewers in proximity to the surface display unit. For example, if the surface display unit is employed in an automobile, the viewing angle for the surface display unit can be selected to provide viewing capability to all passengers in the automobile. Alternatively, if the surface display unit primarily displays images (such as control signals) that are useful only to a person at a particular position (such as the driver of an automobile), the viewing angle can be adjusted to provide the image most clearly to the person who needs to view the image.

In one embodiment, the opaque screen 180 can include optical features to provide a narrow viewing angle so that only a viewer at a predetermined angle and/or position can view the optical image through the opaque screen 180. Such optical features include, but are not limited to, gratings and arrays of reflective surfaces.

Without wishing to be limited, the following examples are provided for illustrative purposes only.

In a first illustrative example, the opaque matrix material layer 130 can include a laminate including at least a glass layer and a polymer layer (which functions as a diffusion material layer). The glass layer can be a 0.65 mm thick layer of aluminosilicate glass having the following composition: 70 mol % $SiO_2$, 8.5 mol % $Al_2O_3$, 14 mol % $Na_2O$, 1.2 mol % $K_2O$, 6.5 mol % MgO, 0.5 mol % CaO, and 0.2 mol % $SnO_2$. The aluminosilicate glass can be chemically strengthened by immersing in a molten salt bath to generate a surface compressive stress extending to a depth within in the glass.

The front surface of the aluminosilicate glass (i.e., the surface facing the viewer) can have anti-glare finish of 14% haze, which provides translucent appearance. At this level, one could see an analog clock (non-luminescent type) behind such a surface, but would not be able to tell what time it is based on the display on the clock.

A polymer layer forming a diffusion surface is employed as a diffusion material layer. The polymer layer can be present on the front side of the aluminosilicate glass or on the back side of the aluminosilicate glass. The polymer layer can be at least one polyethylene terephthalate (PET) layer. The polymer layer can have a white appearance, and can be laminated to the layer of the aluminosilicate glass as a cladding layer. The polymer layer tested employed a polymer material originally provided by Prodisplay™ and custom-tailored to reduce halo effects.

The thin adhesive layer 120 can include an acrylic adhesive, which may be omitted if the image panel and the opaque matrix material layer 130 can be spatially fixed with respect to each other. Without employing a thin adhesive layer 120, the polymer layer may be placed between the aluminosilicate glass and the image panel 110. In this case, the polymer layer may be laminated between polyvinyl butyral (PVB) layers or between thermoplastic polyurethane (TPU) layers (as in a windshield laminate). The image panel 110 may employ light emitting diodes (LED's).

In a second illustrative example, the opaque matrix material layer 130 can include the same aluminosilicate glass as in the first illustrative example. The aluminosilicate glass can be chemically strengthened by immersing in a molten salt bath to generate a surface compressive stress extending to a depth within in the glass.

As in the first illustrative example, the front surface of the aluminosilicate glass can have anti-glare finish of 14% haze, which provides translucent appearance.

A polymer layer forming a diffusion surface can be present on the front side of the aluminosilicate glass or on the back side of the aluminosilicate glass. The polymer layer can be at least one polyvinyl butyral (PVB) layer having a white appearance, and can be laminated to the layer of the aluminosilicate glass as a cladding layer. The at least one PVB layer was not optimized to reduce scattering in this case. The polymer layer in the second illustrative example provided a more true "white" color, which may be preferred for providing luxurious ambience, for example, in an automobile.

The opaque matrix material layer 130 can include additional sheet of glass located on the opposite side of the polymer layer. The additional sheet of glass may have a desirable optical finish such as an anti-glare finish.

The surface display unit of the second illustrative example provides less scattering from the front side (and also less scattering when viewed from the back side). The surface display unit of the second illustrative example shows a halo effect due to minor reflection peaks (which have lower intensity).

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art.

It is also to be understood that, as used herein the terms "the," "a," or "an," mean "at least one," and should not be limited to "only one" unless explicitly indicated to the contrary. Thus, for example, reference to "a layer" includes examples having two or more layers unless the context clearly indicates otherwise. Likewise, a "plurality" or an "array" is intended to denote "more than one."

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially uniform" surface is intended to denote a surface that is uniform or approximately uniform.

Unless otherwise expressly stated, it is in no way intended that any method set forth herein be construed as requiring that its steps be performed in a specific order. Accordingly, where a method does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

The invention claimed is:

1. A surface display unit comprising:
    an image panel configured to provide an optical image on a front surface thereof; and
    a opaque screen disposed over the front surface of the image panel,
    wherein the opaque screen comprises an opaque matrix material layer that transmits light, reflects light or transmits and reflects light from the image panel;
    wherein the opaque matrix material layer has a transmission coefficient of from 0.01 to 0.5 within the wavelength range from 400 nm to 800 nm for light from the optical image.

2. The surface display unit of claim 1, wherein the opaque matrix material layer attenuates light impinging thereupon from a front side of the opaque matrix material layer and transmits light from the image panel.

3. The surface display unit of claim 1, wherein the opaque matrix material layer comprises an opaque glass-ceramic material.

4. The surface display unit of claim 1, wherein the opaque matrix material layer is provided as a single sheet or as a laminate structure comprising multiple layers.

5. The surface display unit of claim 1, wherein the opaque matrix material layer comprises a layer stack of a transparent material layer and a diffusion material layer that provides optical diffusion.

6. The surface display unit of claim 1, wherein the opaque matrix material layer comprises a glass core with at least one optically opaque cladding thereupon.

7. The surface display unit of claim 1, wherein the opaque matrix material layer comprises a dye-sensitized material layer.

8. The surface display unit of claim 1, wherein the opaque matrix material layer comprises a dye-doped liquid crystal material.

9. The surface display unit of claim 1, wherein the opaque matrix material layer comprises a material having one or more peaks in a transmission coefficient as a function of wavelength within a range from 400 nm to 800 nm.

10. The surface display unit of claim 9, wherein multiple peaks are present in the transmission coefficient, and correspond to wavelengths of illumination radiation of the optical image formed at the image panel.

11. The surface display unit of claim 1, wherein the opaque matrix material layer comprises a material having at least two states corresponding to different transmission coefficients, wherein a ratio of a first transmission coefficient for an off-state to a second transmission coefficient for an on-state is in a range from 0.001 to 0.5 with a wavelength range from 400 nm to 800 nm.

12. The surface display unit of claim 1, wherein the opaque matrix material layer comprises an electrochromatic material layer, or a photochromatic material layer.

13. The surface display unit of claim 1, wherein the image panel comprises a display unit that generates an image employing a single illumination source.

14. The surface display unit of claim 1, wherein the image panel comprises a pixilated display device.

15. The surface display unit of claim 1, wherein the image panel comprises a display panel including a plurality of micro light emitting diodes provided in an array pattern.

16. The surface display unit of claim 1, wherein the optical image is transmitted from the image panel through the opaque screen to a viewer.

17. The surface display unit of claim 1, further comprising a projection source for emitting an image onto the opaque screen.

18. The surface display unit of claim 17, wherein the image is reflected from the front surface to a viewer.

19. The surface display unit of claim 1, wherein the image panel has multiple brightness settings to provide different amount of illumination.

20. The surface display unit of claim 1, wherein the image panel has a color weighted brightness adjustment system to compensate for a non-uniform transmission coefficient curve of a material of the opaque matrix material layer within a visible wavelength range.

* * * * *

UNITED STATES PATENT AND TRADEMARK OFFICE
CERTIFICATE OF CORRECTION

PATENT NO. : 10,379,265 B2  
APPLICATION NO. : 15/572346  
DATED : August 13, 2019  
INVENTOR(S) : Gordon Charles Brown Page 1 of 1

It is certified that error appears in the above-identified patent and that said Letters Patent is hereby corrected as shown below:

On the Title Page

In Column 2, item (56), Other Publications, Line 2, delete "fi lm" and insert -- film --, therefor.

In Column 2, item (57), Abstract, Line 12, delete "opque" and insert -- opaque --, therefor.

In the Claims

In Column 15, Line 54, Claim 1, delete "panel;" and insert -- source; --, therefor.

In Column 15, Line 62, Claim 2, delete "panel." and insert -- source. --, therefor.

Signed and Sealed this  
Seventh Day of January, 2020

Andrei Iancu  
*Director of the United States Patent and Trademark Office*